July 17, 1934.  I. J. WILSON  1,967,139
MACHINE FOR TESTING ANGULARITY OF WHEELS
Filed June 9, 1928   4 Sheets-Sheet 1
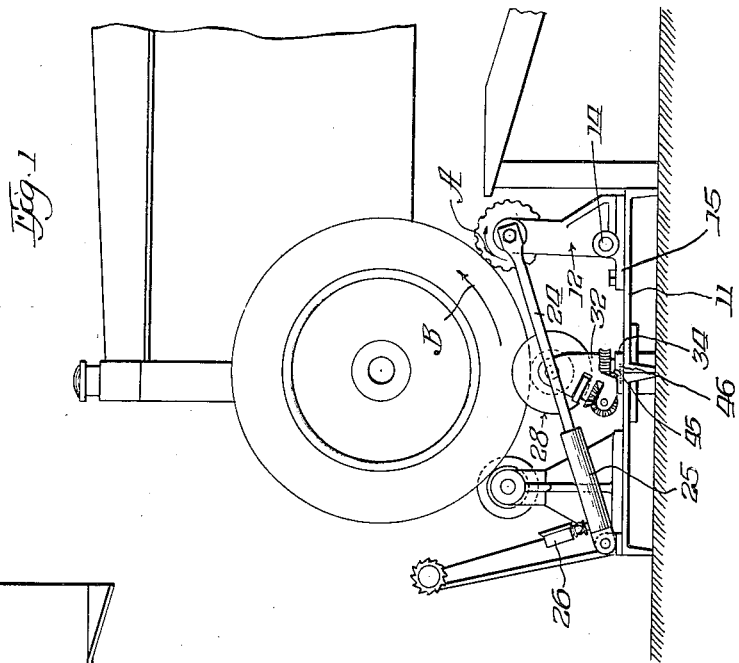
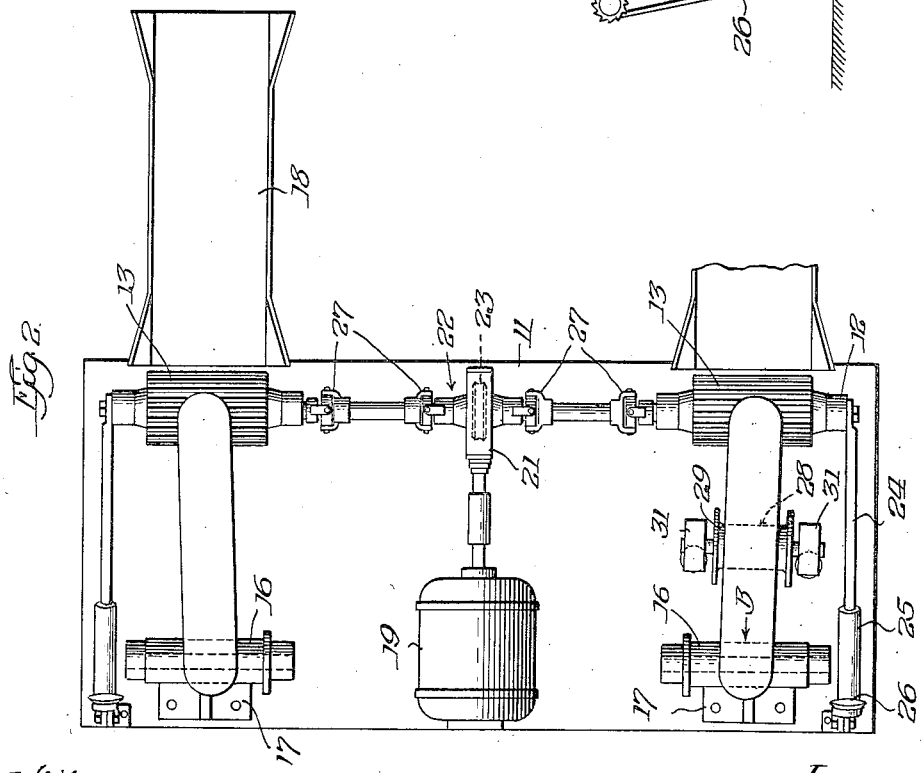

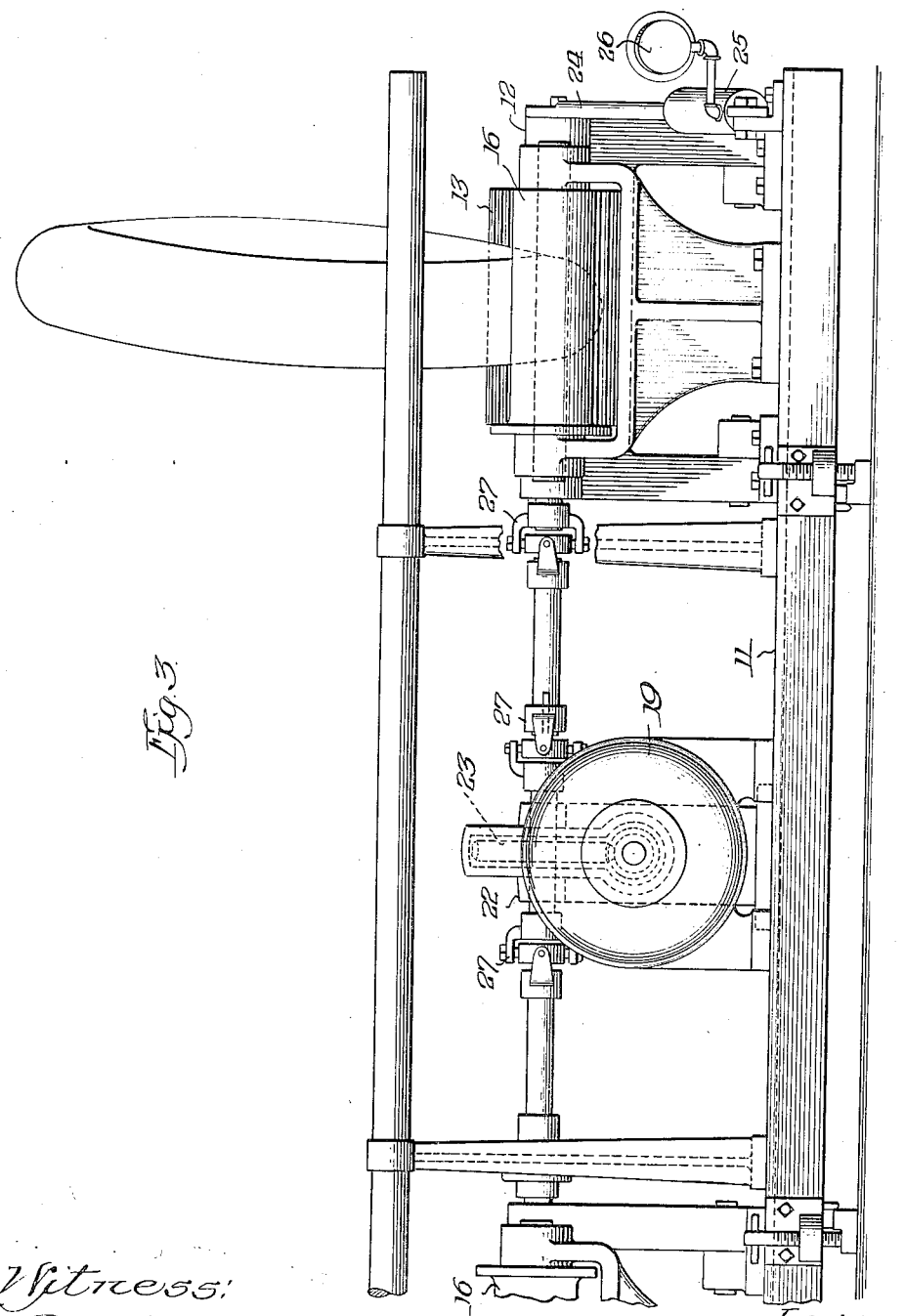

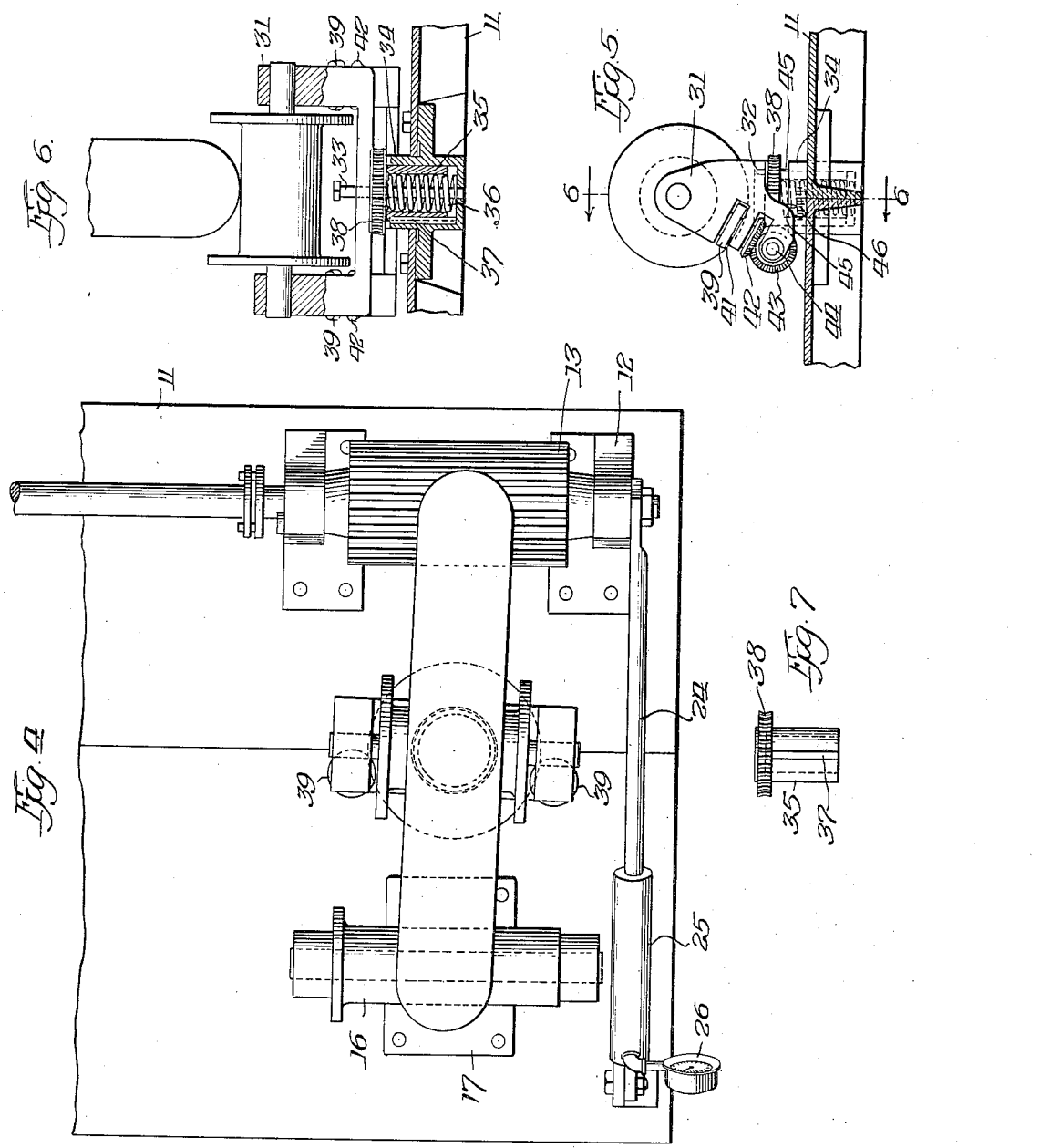

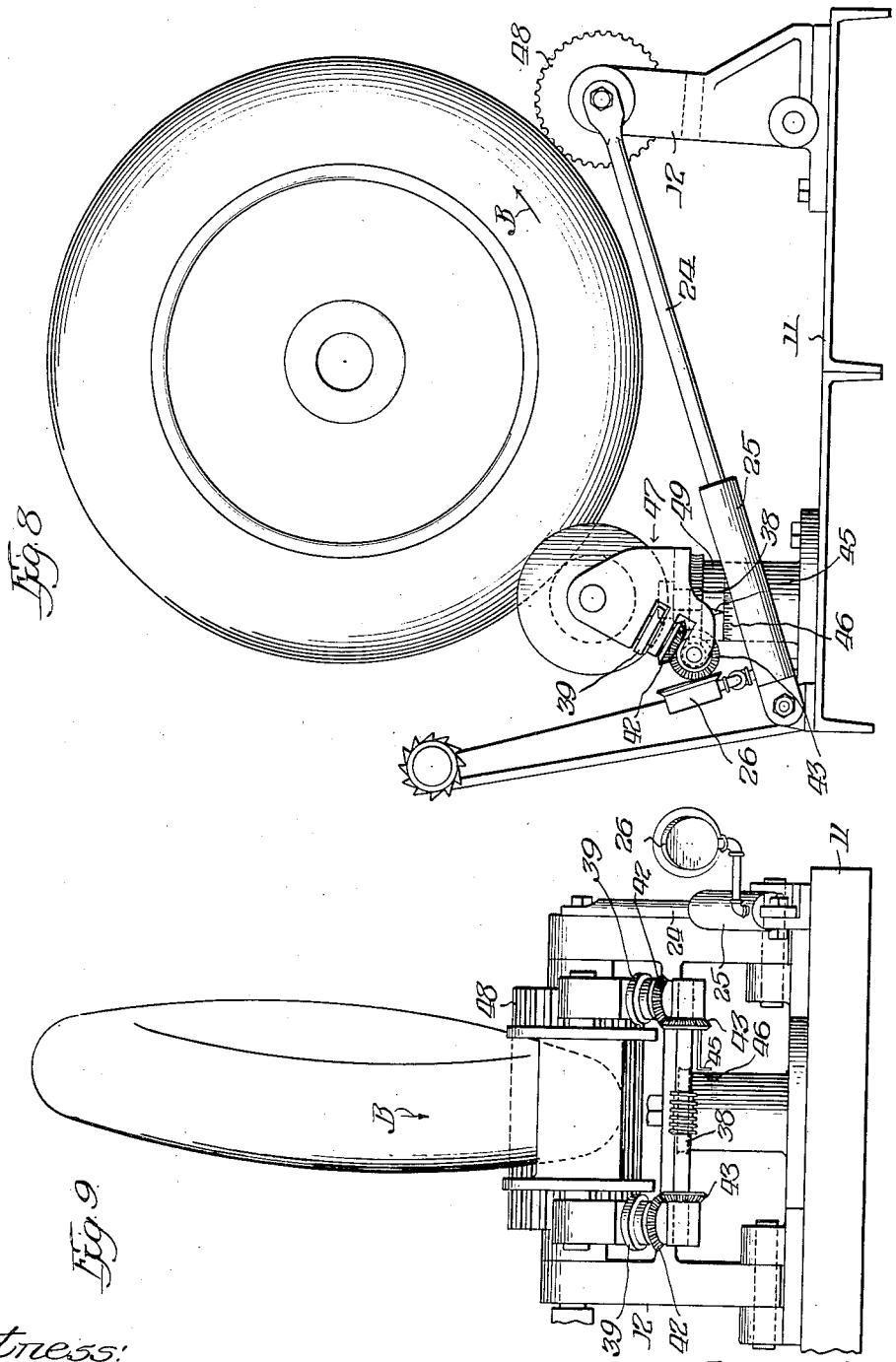

Patented July 17, 1934

1,967,139

UNITED STATES PATENT OFFICE 1,967,139

MACHINE FOR TESTING ANGULARITY OF WHEELS

Ira J. Wilson, Winnetka, Ill., assignor to Bendix Aviation Corporation, South Bend, Ind., a corporation of Delaware Application June 9, 1928, Serial No. 284,023

9 Claims. (Cl. 33—203)

This invention relates to a combined brake testing apparatus and a device for testing the angularity such as the toe-in of the front wheels of vehicles. It is highly desirable to make as many of the necessary tests in connection with the wheels of automobiles at the same time especially where some of the necessary apparatus for one test can be used in another, thus effecting an economy not only in time but in parts.

The primary object of this invention is accordingly to provide a combined brake testing apparatus and means for testing the angularity, for example the toe-in, of vehicle wheels.

Another object of this invention is to provide a device for testing the angularity of vehicle wheels including a roller or drum in combination with a brake testing apparatus whereby the need for a special mechanism to drive the roller is eliminated.

A further object of this invention is to provide a device for indicating the angularity of a vehicle wheel which is rugged and efficient.

Other and further objects of this invention will be apparent as the same becomes better understood from an examination of the specification and claims in connection with the accompanying drawings wherein:

Fig. 1 represents a side elevation of an apparatus embodying this invention,

Fig. 2 is a plan view of the same,

Fig. 3 is an enlarged fragmentary front elevation of the apparatus,

Fig. 4 is a fragmentary plan view of one side of the apparatus,

Fig. 5 is a detail fragmentary side view of the device for measuring the toe-in, removed from the rest of the apparatus, Fig. 6 is a sectional view taken at the line 6—6 of Fig. 5, Fig. 7 is a detail view of a part of the device shown in Fig. 5, Fig. 8 is a side elevation of a modification, and Fig. 9 is a front elevation of the same with parts removed.

Referring to the drawings more particularly the apparatus illustrated in Figs. 1 to 7, inclusive, includes a base 11 on which is mounted two pairs of transversely spaced uprights 12 each pair carrying a corrugated roller 13, the axes of which are parallel to each other and parallel to the two axles of the car. The uprights 12 are arranged on the base so that the rollers 13 are normally spaced apart the width of the vehicle being tested and are in alignment with each other. These uprights 12 are each connected by a horizontal pivot pin 14 to a bracket 15 which is attached to the base the uprights thus being capable of forward pivotal movement as will be hereinafter explained. Each roller 13 has positioned forwardly thereof in parallel spaced relation an idler roller 16. Each roller 16 is carried in a bifurcated upright 17 attached to the base 11 and is adapted to cooperate with its respective roller 13 to support one of the front wheels of a vehicle. A pair of ramps 18 are provided to enable the car to be driven in position with the front wheels supported by the rollers. A motor 19 centrally positioned on the base 11 is adapted by means of a worm 21 on the motor shaft to drive the rollers 13 through the medium of a shaft 22 connecting said rollers and a worm wheel 23 on the latter shaft. These rollers 13 are driven in the direction of the arrow A shown in Fig. 1 to turn the wheels of the automobile thereon in the direction indicated by the arrow B. When the brakes are applied the resistance offered by each wheel to rotation by its roller 13 will cause the roller to travel in a clockwise direction on the periphery of the automobile wheel or in other words to creep under the wheel, pivoting the uprights 12 forwardly. The forward movement of each of the uprights 12 is resisted by a plunger 24 operating in a hydraulic cylinder 25. Since the pressure exerted on the plunger 24 will depend upon the resistance offered by the automobile wheel to rotation by the respective rollers 13, pressure gauges 26 on each of the cylinders 25 will indicate when properly graduated the effectiveness of the brakes. Since the brakes of the two wheels will not always be the same, one roller 13 may move farther out of its normal position than the other. For this reason a pair of universal joints 27 are provided on the shaft 22 upon either side of the worm wheel 23 rendering said shaft operable even though its angular position may be varied.

The aforedescribed parts comprising the brake testing mechanism do not in themselves constitute a part of this invention. However, in order that the angularity such as toe-in of the front wheels may be tested either simultaneously with the testing of the brakes or at least upon the same machine and without removing the automobile therefrom, I provide an additional roller generally designated by the reference character 28, which may be called the toe-in roller. As the rollers 13 are driven and the front wheels of the vehicle are rotated thereby any angularity or inclination in a horizontal plane such as toe-in of the axes of the wheels with respect to the axes of the rollers will tend to move the front of the automobile laterally due to the scuffing or steering action between the wheels and the rollers. As the front wheels of the vehicle are thus rotated the steering wheel of the vehicle may be adjusted until no lateral movement takes place. When this adjustment has been accomplished the wheels will have been positioned so as to guide the vehicle straight forward, that is, the scuffing and guiding action of the two front wheels will be equalized and there will be no tendency toward lateral movement of the vehicle. When the wheels have been thus equalized the toe-in of one wheel and consequently of both wheels may be found as will be hereinafter explained.

The toe-in roller 28 is mounted to yieldingly engage the periphery of one of the wheels of the automobile at the lowermost point of said periphery at a position substantially midway between the rollers 16 and 13 and is also mounted to swing in a horizontal plane to automatically align itself with the axis of the wheel that is parallel thereto or substantially parallel thereto according to the camber or lack of camber of the wheels of the vehicle so that the angularity of the axis of the toe-in roller indicates the angularity of the axis of the wheel in a horizontal plane.

The toe-in roller includes the roller proper designated by reference character 29 horizontally journaled between vertical arms 31 the latter being mounted on a carriage 32. The roller 29 is slidable in an axial direction between the arms 31 a limited amount and is adapted to be actuated in one direction or the other by the scuffing action of the vehicle wheel depending upon the angular position of the axis of said wheel. When the axis of the roller 29 is substantially parallel to or in substantially the same plane with the axis of the wheel said roller will not move laterally with respect to the wheel as there will then be no scuffing action. The carriage 32 is mounted to swing about a vertical pivot pin 33 in mount 34. The mount 34 includes an inner and upper telescopic section 35 which is yieldably held upwardly by a spring 36 surrounding the pin 33 whereby the toe-in roller may yieldingly engage the vehicle wheel and may accommodate different sized wheels. The section 35 is keyed to the outer section of the mount 34 by a spline 37 which prevents rotational movement between the two sections but permits relative vertical movement therebetween. The upper section 35 is surrounded by a fixed worm wheel 38. Each of the arms 31 of the carriage 32 is provided with a friction wheel 39 on a short shaft 41. Each shaft 41 has provided thereon a beveled pinion 42 in mesh with a beveled pinion 43 one of which is at each end of a transverse shaft 44 mounted between the arms 31. This shaft 44 is provided with a central worm 40 which is in engagement with the gear 38. In operation the toe-in roller 29 is moved axially one way or the other by the scuffing action of the vehicle wheel, if there is any, angularity between the respective axes of the wheel and roller causing the roller to contact with one of the friction wheels 39 and drive the shaft 44. Rotation of shaft 44 will cause the worm on the latter shaft to engage the worm gear 38 on the mount and swing the carriage 32 to automatically bring the axis of the roller into substantially parallelism with that of the vehicle wheel. The angularity of the axis of the toe-in roller, after it has thus conformed substantially to the angularity of the axis of the wheel of the vehicle, will be representative of the angularity between the axis of the roller and the wheel whereby a pointer 45 attached to the carriage 32 cooperating with a plurality of graduations 46 on the mount 34 will indicate such angularity.

As shown in Figs. 8 and 9 the toe-in roller, here generally designated by reference character 47, may take the place of one of the idler rollers 16. In this modification the toe-in roller differs from the previous one in that it is mounted in position to cooperate with one of the driving rollers 48 (same as 13 in the other embodiment) for supporting one of the front wheels of the vehicle. In this modification the toe-in roller 47 is not yieldable as before, the mount 49 for said roller being of a single section. In view of the fact that here the toe-in roller is not in position to engage the wheel of the vehicle on its lowermost periphery and therefore may be affected by the camber of the wheel the horizontal axis of said roller is preferably set at a slight angle to conform to the average camber in order that a minimum of the scuffing action on said roller will be due to camber. The operation of this modification is substantially the same as that of the previous embodiment which will be apparent without further description.

In the use of either of the aforedescribed constructions the wheels of the vehicle may be tested for toe-in at substantially the same time as the brakes are tested by the addition of a very slight amount of equipment.

I am aware that many changes may be made without departing from the principles of this invention and I therefore do not wish to be limited to the details shown or described.

I claim:

1. In an apparatus of the character described, the combination of a base, means on said base for supporting a wheel of a vehicle, said means including a roller in contact with the wheel, means for rotating said roller, a second roller mounted for rotation about its axis and for pivotal movement about an axis other than its axis of rotation said second roller being positioned to contact said wheel at a point spaced from the point of contact of the first roller whereby said second roller will be rotated about the latter axis to varying degrees in accordance with the angularity of the axis of the wheel being tested and means for evaluating the pivotal movement of a said pivoted roller to indicate the angularity of the axis of the wheel.

2. In an apparatus of the character described, the combination of a roller adapted to contact the wheel of a vehicle for driving the same, a second roller mounted for pivotal movements about an axis substantially perpendicular to its axis of rotation, said roller being positioned to contact said wheel at a position spaced from the point of contact of the first roller, said second roller being capable of rotation about its axis and of axial movement parallel to its axis of rotation, and means operable upon axial movement of the second roller to automatically swing said second roller about its pivotal axis until its axis of rotation is substantially parallel to the axis of the wheel being tested and means for evaluating the pivotal movement of said pivoted roller to indicate the angularity of the axis of the wheel being tested.

3. In an apparatus of the character described, the combination of a roller adapted to contact the wheel of a vehicle for driving the same, another roller mounted for rotation about its axis and for pivotal movement about an axis substantially parallel to its own axis of rotation said latter roller positioned to contact said wheel at a point spaced from the point of contact of the first roller whereby said latter roller will be rotated about the latter axis to varying degrees in accordance with the angularity of the axis of the wheel being tested said second roller being provided with a carriage and a mount and being capable of lateral movement with respect to the carriage and means including a worm operable upon lateral movement of the said latter roller and extending longitudinally with respect thereto for automatically swinging said latter roller about its pivot to bring the axis of rotation of said latter roller substantially parallel to that of the wheel being tested.

4. A wheel testing machine of the character specified comprising, a support provided with a scale, a frame pivoted to the support and provided with an indicating element to act jointly with said scale, a shaft carried by the pivoted frame and having its axis in a plane at right angles to the pivot axis of the frame, and a wheel engaging roller mounted on said shaft to rotate and slide axially thereon.

5. An apparatus of the character described comprising a support, a scale on the support, a frame pivoted on the support, a pointer on the frame for cooperation with the scale, a rotatable axially movable wheel engaging member supported on the frame, and means operated through the wheel engaging member including a train of gears for changing the position of the wheel engaging member.

6. An apparatus of the character described comprising a support, a scale on the support, a frame pivoted on the support, means yieldingly supporting the frame on its pivot, a pointer on the frame for cooperation with the scale, a rotatable axially movable wheel engaging member supported on the frame, and means operated through the wheel engaging member for changing the position of the frame.

7. An apparatus of the character described comprising a support, a frame pivoted thereon, means resiliently supporting the frame on its pivot including a spring sleeved on the pivot, a scale on the support, a pointer on the frame for cooperation with the scale, a rotatable axially movable wheel engaging member supported on the frame, and means operated through the wheel engaging member for changing the position of the frame.

8. An apparatus of the character described comprising a support including telescopic sections, a spring within the sections tending to urge the sections apart, a pivot pin on the support extending concentrically through sections, a frame pivoted on the pin and bearing against one of the sections, a scale on the support, a pointer on the frame for cooperation with the scale, a rotatable and axially movable wheel engaging member supported on the frame, and means operative through the wheel engaging member for changing the position thereof.

9. An apparatus of the character described comprising a support including a sleeve secured in a fixed position, a member slidable therein, means retaining the slidable member against rotation, a gear on the outer end of the slidable member, a spring urging the member outwardly, a pin on the support extending concentrically through the member, a frame pivoted on the pin and bearing against the gear on the slidable member, a scale on the support, a pointer on the frame for cooperation with the scale, a rotatable and axially movable wheel engaging member supported on the frame, a driving member on the frame arranged for frictional engagement with the wheel engaging member, a worm gear meshing with the gear on the slidable member, and driving connections between the driving member and the worm gear.

IRA J. WILSON.